(12) United States Patent
Teychene et al.

(10) Patent No.: US 12,507,670 B2
(45) Date of Patent: Dec. 30, 2025

(54) SAMPLING DEVICE FOR STORING AT LEAST ONE SAMPLE OF ANIMAL TISSUE, CORRESPONDING METHOD FOR COLLECTING AND SYSTEM FOR IDENTIFYING AN ANIMAL

(71) Applicant: ALLFLEX EUROPE SAS, Vitre (FR)

(72) Inventors: Bruno Teychene, Mouzieys-Teulet (FR); Johan Decaluwe, Laval (FR)

(73) Assignee: ALLFLEX EUROPE SAS, Vitre (FR)

( * ) Notice: Subject to any disclaimer, the term of this patent is extended or adjusted under 35 U.S.C. 154(b) by 520 days.

(21) Appl. No.: 17/928,052

(22) PCT Filed: May 25, 2021

(86) PCT No.: PCT/EP2021/063944
§ 371 (c)(1),
(2) Date: Nov. 28, 2022

(87) PCT Pub. No.: WO2021/239751
PCT Pub. Date: Dec. 2, 2021

(65) Prior Publication Data
US 2023/0210087 A1 Jul. 6, 2023

(30) Foreign Application Priority Data
May 28, 2020 (EP) ..................................... 20315272

(51) Int. Cl.
*A01K 11/00* (2006.01)
(52) U.S. Cl.
CPC ................................ *A01K 11/003* (2013.01)
(58) Field of Classification Search
CPC ............ A61B 10/0096; A61B 10/0266; A01K 11/003
See application file for complete search history.

(56) References Cited

U.S. PATENT DOCUMENTS

| 8,763,287 B2 | 7/2014 | Hilpert |
| 9,301,497 B2 | 4/2016 | Hilpert et al. |

(Continued)

FOREIGN PATENT DOCUMENTS

| WO | 2008040692 A1 | 4/2008 |
| WO | 2010070130 A2 | 6/2010 |

(Continued)

OTHER PUBLICATIONS

International Search Report dated Aug. 6, 2021 for corresponding International Application No. PCT/EP2021/063944, filed May 25, 2021.

(Continued)

*Primary Examiner* — Jennifer Robertson
*Assistant Examiner* — Nidhi N Patel
(74) *Attorney, Agent, or Firm* — Keith O'Doherty

(57) ABSTRACT

A sampling device adapted to cooperate with a sampling member subsequent to collection of a sample of animal tissue. The sampling device includes: a receiving tube designed for receiving the sample of animal tissue, containing at least one specific agent and comprising an inlet; a tube head removably attached to the inlet of the receiving tube and provided with a through channel ending in the receiving tube; a closing element configured to take at least two positions: a first position, in which the closing element is held into the tube head so as to plug the through channel of the tube head, and a second position, in which the closing element is released into the receiving tube.

13 Claims, 7 Drawing Sheets

(56) References Cited

U.S. PATENT DOCUMENTS

| | | |
|---|---|---|
| 2010/0016758 A1 | 1/2010 | Hilpert |
| 2012/0010526 A1 | 1/2012 | Hilpert et al. |
| 2014/0249449 A1 | 9/2014 | Hilpert et al. |
| 2016/0007567 A1 | 1/2016 | Decaluwe et al. |

FOREIGN PATENT DOCUMENTS

| | | | |
|---|---|---|---|
| WO | 2010070130 | A3 | 2/2011 |
| WO | 2017153865 | A1 | 9/2017 |

OTHER PUBLICATIONS

Written Opinion of the International Searching Authority dated Aug. 6, 2021 for corresponding International Application No. PCT/EP2021/063944, filed May 25, 2021.

Extended European Search Report dated Nov. 12, 2020 for corresponding European Application No. 20315272.3, filed May 28, 2020.

SAMPLING DEVICE FOR STORING AT LEAST ONE SAMPLE OF ANIMAL TISSUE, CORRESPONDING METHOD FOR COLLECTING AND SYSTEM FOR IDENTIFYING AN ANIMAL

CROSS-REFERENCE TO RELATED APPLICATIONS

This Application is a Section 371 National Stage Application of International Application No. PCT/EP2021/063944, filed May 25, 2021, which is incorporated by reference in its entirety and published as WO 2021/239751 A1 on Dec. 2, 2021, in English.

1. FIELD OF THE DISCLOSURE

The field of the disclosure relates to that of storing and conserving of samples of animal tissue, subsequent to a collection of this animal tissue.

More specifically, the disclosure pertains to the collecting and storing of animal tissue, making it possible to preserve cells carrying the animal's biological or biochemical characteristics, for example in order to subsequently identify the animal or detect sickness in the animal. It can be noted that such collecting can be done on any animal species (cattle, sheep, pigs, goats, poultry, fish, etc.) It is to be noticed sampling animal tissue can be done with the simultaneous placing of an identification tag.

2. BACKGROUND

For many years, the marking of livestock animals, such as cattle, pigs or sheep, has become mandatory in many parts throughout the world.

In order to improve the tracking of livestock, improve productivity (by eliminating diseased animals or searching for singular genetic characteristics, for example), and/or guarantee the origin of animals intended for consumption (for example by detecting illnesses) it is increasingly becoming the practice to carry out one or more operations for taking tissue samples from the animals concerned.

Samples can be taken from an animal when placing an identification tag to identify the animal (at birth for example). Tissue samples can also be taken throughout the animal's existence, for example to detect illness or certify the animal's identity by comparing genetic or biological information, or to evaluate the animal's genetic value. Once collected, the sample of animal tissue can be stored and/or transmitted to a laboratory for analysis.

When a sample is taken simultaneously with the placing of the tag, there are known ways of using a male part having an end-to-end through channel used for the passage of a tissue sample-taking member.

Such way is for example known from the embodiment illustrated in FIG. 3 of document WO2008/040692 filed by the Applicant, in which sample collecting means has an interior space for receiving a tissue sample, and is configured such that it becomes pressed into or through tissue of an animal upon application of the ear tag to generate a tissue sample. After collecting the tissue sample, the end of the hollow needle of the sample collecting means is placed into a receiving tube in order to preserve the sample and facilitate its manipulation.

In order to improve the preservation of a sample, it is known to use a receiving tube filled with a specific agent.

Classically, such a receiving tube comprises a seal formed of a cover, such as an aluminum foil, that can be thermo sealed on a top of the receiving tube so that, before insertion of the hollow needle comprising the sample of animal tissue, the interior of the receiving tube cannot be contaminated and the specific agent stays within the receiving tube.

When inserting the hollow needle into the receiving tube, the hollow needle cuts the cover.

Such a technique offers advantages, but also has drawbacks.

First, as the cover is placed on the top of the receiving tube by thermo sealing or fusing, the top of the receiving tube may be deformed, which is not satisfying for the sealing and the manipulation of the tube later, in a laboratory for example. Indeed, such receiving tubes should often be compatible with a support of sample tubes of a rack type comprising for example 24, 48 or 96 positions, and a deformation due to fusing can generate a tube incompatible to such classical racks. Furthermore, such receiving tubes should often be compatible with classical caps used in laboratories or, when placed in a rack of 96 position, compatible with caps mats which can be used. If the tubes have an irregular geometry due to thermo sealing or fusing, this negatively impacts the use of the tube with standard caps, trays, and processing equipment.

Moreover, the fact that some part of the cover could fall into the receiving tube, during or after its piercing by the needle when inserted into the receiving tube, is not satisfying due to the potential contamination of the sample of animal tissue generated by the parts of the cover.

Besides, parts of the cover and/or glue remaining on the rim of the receiving tube can create sealing troubles which can damage the sample preservation or create a leak of the liquid contained in the receiving tube.

There is therefore need for a novel technique for collecting tissue from an animal that does not have all these prior-art drawbacks.

3. SUMMARY

The disclosure proposes a novel solution that does not have all these drawbacks of the prior art, in the form of a sampling device, adapted to cooperate with a sampling member for collecting a sample of animal tissue, said sampling device comprising:
  a receiving tube designed for receiving said sample of animal tissue, containing at least one specific agent and comprising an inlet;
  a tube head removably attached to said inlet of said receiving tube and provided with a through channel ending in the receiving tube;
  a closing element being configured to take at least two positions:
    one first position (prior to the insertion of said sampling member into said receiving tube), in which said closing element is held into the through channel of said tube head so as to plug the through channel of said tube head, and
    one second position (subsequent to the insertion of said sampling member into said receiving tube), in which said closing element is released into said receiving tube.

Thus, the disclosure includes a novel element, original in collecting systems, which provides a sampling device that avoids possible leakages and contaminations from the exterior before collection of a sample, and preservation of sample contained into the tube after collection of it.

Besides, the use of the disclosed tube head on the receiving tube enables an automation of the opening of the tubes in a laboratory through the "uncapping" of the tube head in such a way that the sample and the closing element remain within the tube.

The disclosure furnishes such a solution that does not damage properties of the sampling device, both before collection and for use in laboratories.

In a first position, the closing element is fixedly attached into said tube head, and for example inserted into the inlet of the tube by force-fitting. In this position, prior to the insertion of said sampling member into said receiving tube, corresponding for example to the shape in which the receiving tubes are commercially distributed, the closing element fulfils the function of a plug of the tube head, and thus of the receiving tube, making it possible to prevent the introduction of impurities into the tube and therefore the contamination of the interior of the tube by the external surroundings.

The plug-forming closing element will also prevent the loss of the specific agent (which can especially take the form of a gel, a cream, an oil, a liquid, a powder, a gas, an impregnated foam, etc.) by ensuring the tight-sealing quality of the tube before it is used.

It is to be noticed that, according to at least one embodiment, said closing element is held into the through channel of said tube head by force-fitting.

According to at least one embodiment, the closing element acts as a cover of the receiving tube before a sampling member is introduced into the receiving tube, thus preventing the agent (for example a liquid) from leaking out.

In the second position, the closing element is released in the receiving tube. As the tube contains at least one specific agent, the closing element can be in contact with the specific agent. It can then fulfill the function of a stirrer or mixer, enabling especially the distribution of the specific agent throughout the sample, for example by mixing and homogenizing the liquid if the specific agent is present in liquid form. It can also act as ballast, enabling the sample to be made to sink to the bottom of the tube or again as a "pestle" used to crush or break up the sample in order to facilitate subsequent analysis.

According to at least one embodiment, when the sampling member is introduced into the receiving tube, it pushes the closing element which is released in the receiving tube, and closes the receiving tube. The sample can stay within the sampling member. In this way, there is no problem of leakage when the receiving tube is closed by the sampling member.

Moreover, with the disclosure, no glue or part of the cover remains on the rim of the receiving tube. Consequently, the rim is clean Thus, no sealing troubles are generated by the disclosed sealing means and standard closing material for a rack with tube can be used in a lab without any problem of leakage. Thus, this solution avoids sample preservation and processing problems and avoids leakage of the agent contained in the receiving tube.

According to at least one embodiment of the disclosure, said tube head comprises a first part forming a flange capable of being supported on a rim of the receiving tube, and a second part linked to said first part and adapted to be inserted into said receiving tube, said second part having a thickness less than a thickness of said first part.

In this way, any force exerted by said tube head onto said receiving tube is optimized such that it avoids cracks onto surface of said tube.

Indeed, due to the fact that the thickness is less for this part of the tube head, the pressure exerted by this part of the tube head on the inner surface of the receiving tube on each contact point is also less, in comparison with a thicker part. Indeed, the greater the thickness, the greater the pressure exerted on the wall of the receiving tube.

According to at least one embodiment of the disclosure, said tube head comprises a third part extending from said second part and forming an end of said tube head, said third part having a flared shape presenting a thickness less than said thickness of said second part.

According to at least one embodiment of the disclosure, said second part and third part are inserted by force-fitting into said receiving tube, said second part and third part having an external shape complementary to an internal shape of said receiving tube.

According to at least one embodiment of the disclosure, said second part and third part have an external diameter comprised between 6 mm and 8 mm, preferentially substantially equal to 7 mm.

In alternative embodiments, second part and third part could have an external diameter greater than 7 mm, but adapted to cooperate with the receiving tube. In this way, the second part and third part of the tube head have a complementary shape as the internal shape of the part of the receiving tube cooperating with them when the tube head is in position within the receiving tube.

For example, second part third part could have an external diameter comprised between 16 mm and 18 mm, preferentially substantially equal to 17 mm.

According to at least one embodiment of the disclosure, said receiving tube has an external diameter lower than or equal to 9 mm.

In an alternative, such receiving tube could have an external diameter lower than or equal to 18 mm.

In this way, the disclosed tube is compatible with lab processing equipment and materials. For example, such receiving tubes are compatible with a support of sample tubes of a rack type comprising for example 96 positions.

It can also be compatible with a support of sample tubes of a rack type comprising for example 24 or 48 positions.

According to at least one embodiment of the disclosure, said receiving tube has an internal diameter comprised between 6 mm and 8 mm, preferentially substantially equal to 7 mm.

In this way, the disclosed tube is compatible with sample processing equipment such as caps, or an arrangement to close tubes on a rack.

According to at least one embodiment of the disclosure, said through-channel is almost cylindrical in the portion holding the closing element in the first position, and has a diameter comprised between 2 mm and 6 mm, preferably 4 mm and 5 mm, preferentially substantially equal to 4.5 mm.

It is to be noticed that the closing element should have the same diameter, or very slightly thicker. In this way, the closing element can be held in the through channel.

According to at least one embodiment of the disclosure, said receiving tube and/or said tube head are formed in thermoplastic polymer.

In this way, such a receiving tube and/or tube head is/are made in a resistant material, which does not interact with the contained agent or the sample.

According to at least one embodiment of the disclosure, said receiving tube and/or said tube head are formed in polypropylene.

According to at least one embodiment of the disclosure, receiving tube and/or tube head could be formed of polyethylene high density or polyethylene low density.

According to at least one embodiment of the disclosure, receiving tube and/or tube head could be formed of Acrylonitrile Butadiene Styrene.

According to at least one embodiment of the disclosure, receiving tube and/or tube head could be formed of Polymethyl methacrylate.

According to at least one embodiment of the disclosure, receiving tube and/or tube head could be formed of Polycarbonate.

According to at least one embodiment of the disclosure, receiving tube and/or tube head could be formed of crystal polystyrene or polystyrene or high impact polystyrene, According to at least one embodiment of the disclosure, receiving tube and/or tube head could be formed of Nylon, for example Nylon 6, 66, 10, or 12.

According to at least one embodiment, the closing element has a density greater than or equal to that of said at least one specific agent contained in said receiving tube.

According to at least one embodiment of the disclosure said closing element is a sphere (or ball) or a cylinder.

Said closing element can be made out of any hard plastic materials, including plastics with hardness similar to polyoxymethylene.

It can also be made out of metal such as inox or steel, as long as it does not react with the specific agent contained in the receiving tube.

According to at least one embodiment, this closing element can be colored. In this way, such closing element is visible inside the tube, thus it can be easier to check if the sampling device has been used or not.

According to one embodiment of the disclosure said at least one specific agent belongs to the group comprising:
  a preserving agent,
  a desiccant,
  a reagent,
  an agent for preparing said sample.

According to at least one embodiment, the closing element has a density greater than or equal to that of said at least one specific agent contained in said receiving tube.

According to at least one embodiment of the disclosure, said closing element comprises means for hooking on to said sample, enabling the sample to be fixedly attached to said closing element.

The disclosure also concerns a method for collecting a sample of animal tissue, implementing a sampling device according to any one of presented embodiments, comprising the following steps:
  applying a sampling member to an animal to obtain a tissue sample of said animal;
  insertion of said sampling member into said sampling device.

According to at least one embodiment of the method, said closing element is pushed into said receiving tube during said step of insertion of said sampling member into said receiving tube.

According to at least one embodiment of the method, the step of applying a sampling member to an animal to obtain a tissue sample of said animal comprising the following steps:
  providing a tag for identifying an animal comprising a male part, including said sampling member detachably mounted within said male part, and a female part;
  applying said male and female parts to said animal so that said sampling member is able to cut out a sample of animal tissue;
  detaching said sampling member from said male part.

The disclosure also concerns a system for identifying an animal comprising:
  a tag for identifying an animal comprising:
    a male part, comprising at least one sampling member intended to cut out a sample of animal tissue, said sampling member being detachably mounted within said male part;
    a female part, and
  a sampling device for collecting a sample of animal tissue, according to any of previous embodiments.

4. LIST OF FIGURES

Other features and advantages of the disclosure shall appear more clearly from the following description of particular embodiments, given by way of a simple illustratory and non-exhaustive examples and from the appended figures, of which:

5. DETAILED DESCRIPTION OF EMBODIMENTS OF THE DISCLOSURE

The storage of tissue samples of an animal makes it possible to subsequently identify the animal or detect diseases in said animal, in view of a microscopic examination or an extraction of a genetic information from the sample cells, for example.

The general principle of the disclosure relies on the use of a closing element combined with the use of a receiving tube and a tube head to form a sampling device for collecting and storing a sample of animal tissues. Such sampling device can cooperate with a sampling member.

In at least one embodiment, such sampling device both prevents leaks or contamination before the insertion of a sampling member into the sampling device (and especially before sampling) and improves preservation of sample after insertion of the sampling member into the sampling device.

Here, the term "closing element" is understood to mean an element having a certain mass and able to close the through channel of the tube head, when in a position before insertion of the sampling member into the sampling device of the sampling device.

Below, a specific embodiment of the disclosure is described with the help of FIGS. 1 to 5.

Figure 1:
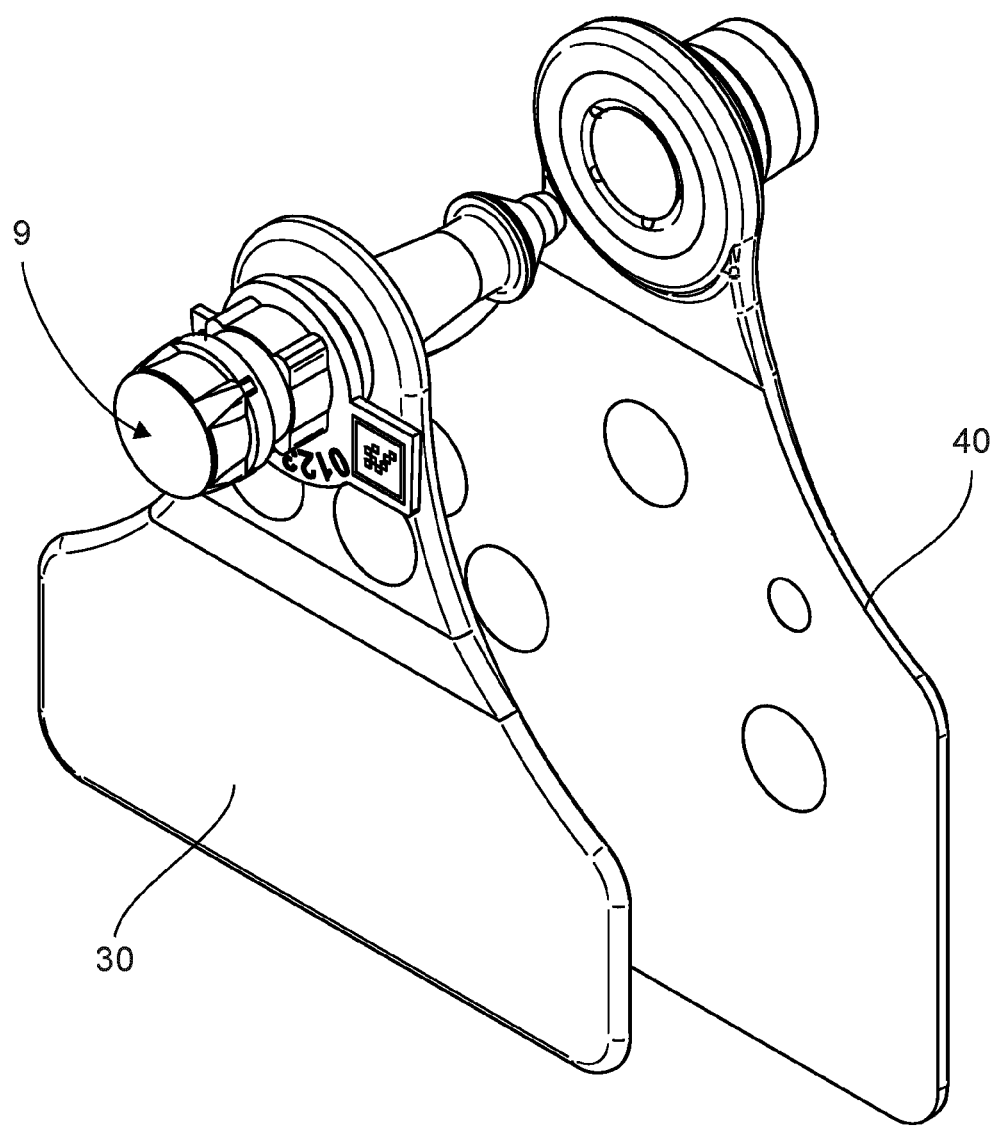
FIG. 1 illustrates a perspective view of a system for identifying an animal according to one embodiment of the disclosure.

FIG. 1 illustrates a tag, for example an ear tag, comprising a male part 30 and a female part 40. The male part 30 comprises a shaft extending from a base and ending in a locking head designed to be inserted into the female part 40 to fixedly attach said tag to an animal. The shaft is traversed by a longitudinal channel enabling the passage of at least a part of an animal tissue sampling member 9.

Figure 2:
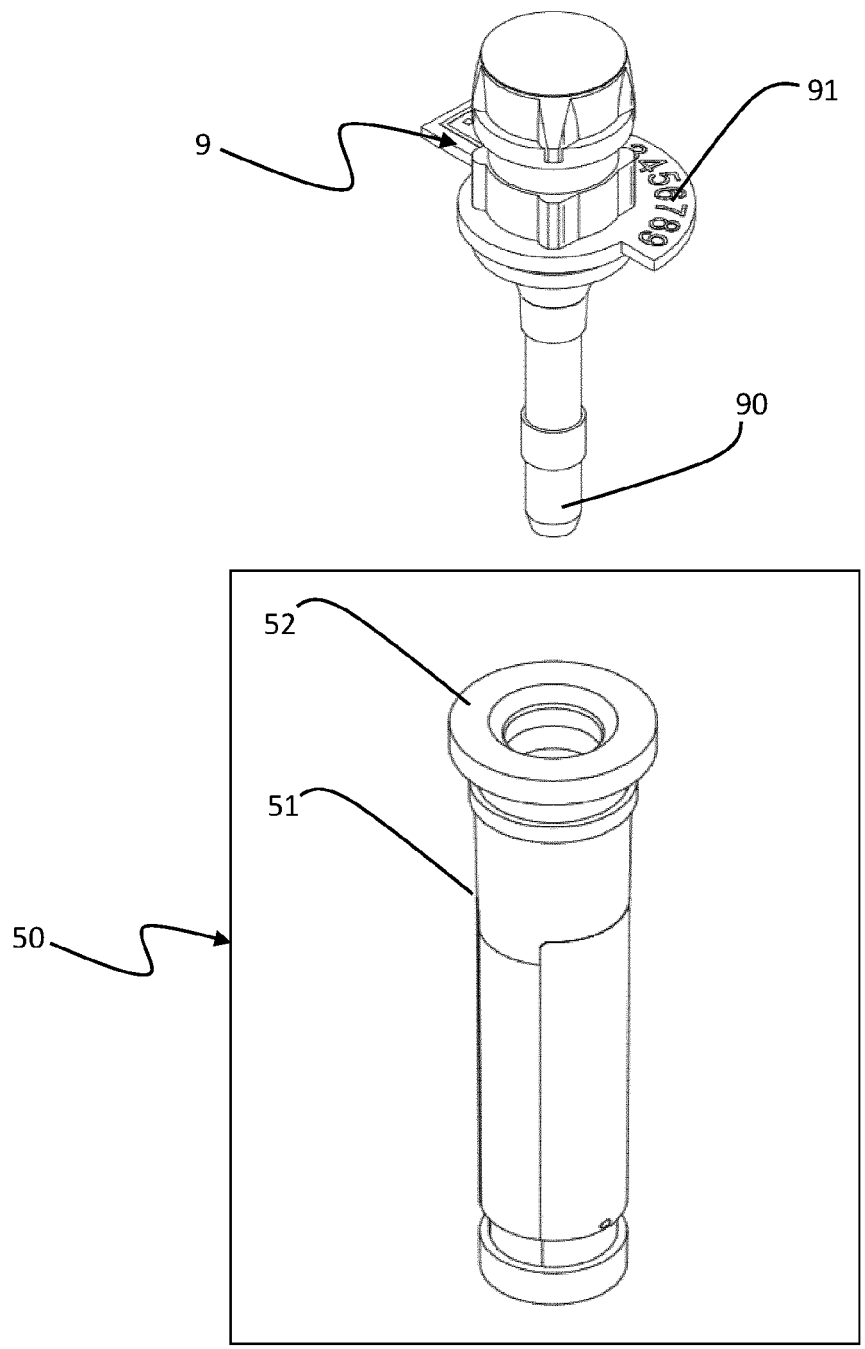
FIG. 2 illustrates a perspective view of a sampling device and a sampling member according to one embodiment of the disclosure.

As shown in FIG. 2, the sampling member 9 comprises an upper part including a support 91 and a lower part formed of a hollow needle 90. The support 91 can carry an identifier for identifying the sample, that can be used for the traceability of the sample, for example later during tests in labs. Such identifier can be the same as an identifier located on the male part 30 and/or female part 40. In another embodiment, the identifiers are not the same, but enable to identify the same animal.

The hollow needle 90 presents a cutting end intended to cut out the sample of the animal tissue and a hollow body intended for keeping the cut sample.

By pressing the male and the female part together, with some part of the animal's (such as the ear) between male and female parts, the cutting end is in contact with the animal and cuts out a sample of the animal tissue. This sample is, in this embodiment, kept inside the hollow body of the needle 90.

When the male part has been inserted into the female part, the sampling member 9, with the sample, can be detached from the male part and inserted into the sampling device 50. The sampling device 50 is thus adapted to cooperate with the sampling member 9.

We now describe the sampling device 50, with reference to FIGS. 2 to 5.

The sampling device 50 comprises:
a receiving tube 51 designed for receiving the sample of animal tissue and comprising an inlet 510;
a tube head 52 removably attached to the inlet 510 of the receiving tube and provided with a through channel 520, and
a closing element 53.

The receiving tube contains at least one specific agent 54. In this embodiment, this at least one specific agent, including one or more of:
a preserving agent,
a desiccant,
a reagent,
an agent for preparing said sample and
an agent for preserving said sample.

This agent 54 can be in any form suitable for its purpose, including a gel, a liquid, a powder, beads, or foam. The agent can improve the preservation of the sample or help to prepare it for future analyses in the laboratory.

It is to be noticed that, according to a specific embodiment, the closing element 53 has a density greater than or equal to that of the specific agent 54 contained in the receiving tube 51. In this way, the closing element will not stay at the surface of the agent 54 which could cause trouble during further tests onto the sample, for example by blocking pipetting.

It can be noted that the closing element is preferably made out of a neutral and inert material, i.e. a material that produces no chemical or physical reaction with the specific agent(s) 54, the tissue sample, or any reagents or agents introduced into the sampling device 51 after the storage of the sample.

The closing element 53 advantageously takes the form of a sphere or a cylinder having a circular section to adapt as efficiently as possible to the shape of the tube head 52 which is also adapted to the shape of receiving tube 51. Thus, it preferably has a diameter substantially equal to (or very slightly thicker than) a cylindrical portion of the through channel of the tube head 52.

In this embodiment, the cylindrical portion of the through channel 520 (also called second part of the tube head) has a diameter substantially equal to 4.5 mm.

Thus, the closing element 53 has, in this embodiment, a diameter substantially equal to (or very slightly thicker than) 4.5 mm.

In other embodiments, the cylindrical portion of the through channel (also called second part of the tube head) could have a diameter comprised between 4 mm and 5 mm.

According to the disclosure, the closing element 53 is configured to take at least two positions:
one first position prior to the insertion of the sampling member 9 into the sampling device 50, which can thus be prior to the fixation of the tag onto the animal or after the fixation of the tag onto the animal but prior to the insertion of the sampling member 9 into the sampling device 50;
one second position subsequent to the insertion of the sampling member 9 into the sampling device 50.

More particularly, in other terms, the first position is prior to the insertion of the sampling member 9 into the sampling device 50, and the second position is subsequent to the insertion of the sampling member 9 into the sampling device 50.

Figure 3:
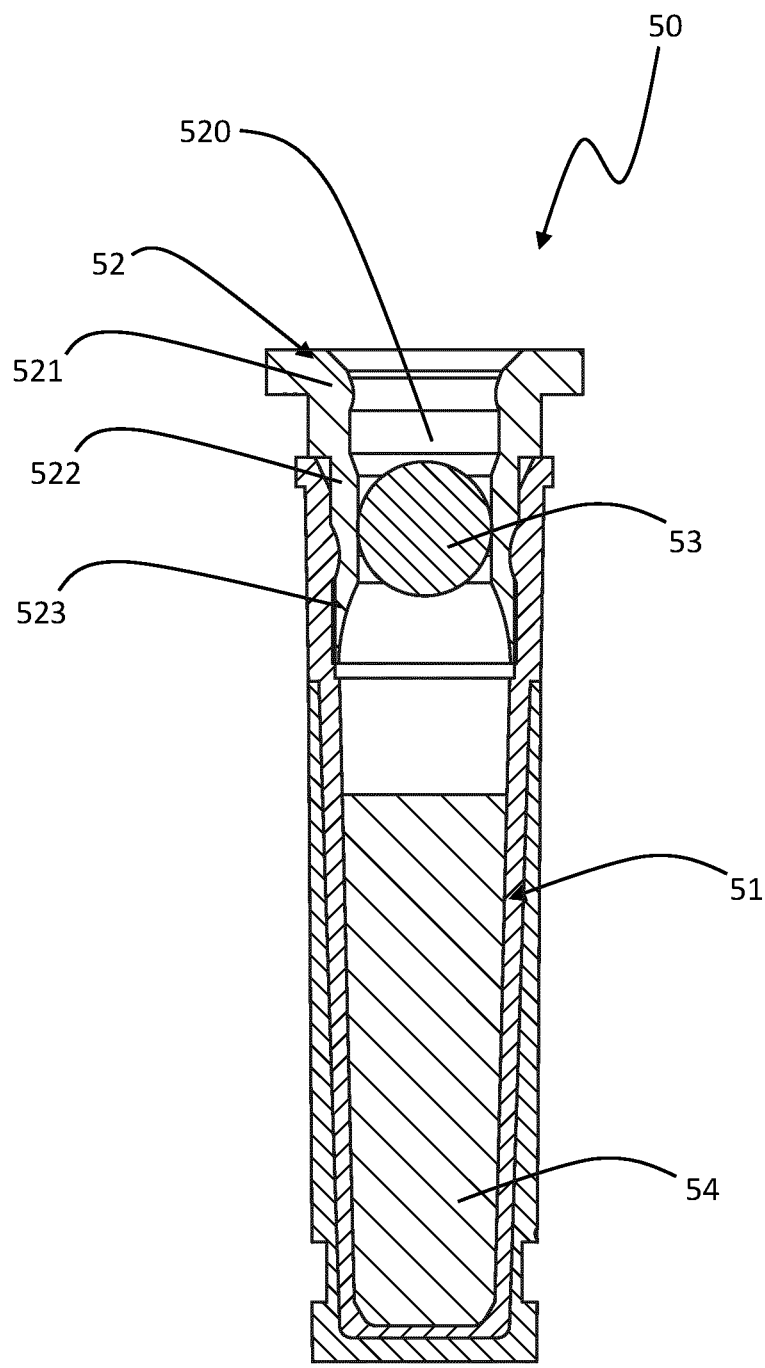
FIG. 3 illustrates a cross-section view of a sampling device according to the embodiment of FIG. 2.
Figure 4:
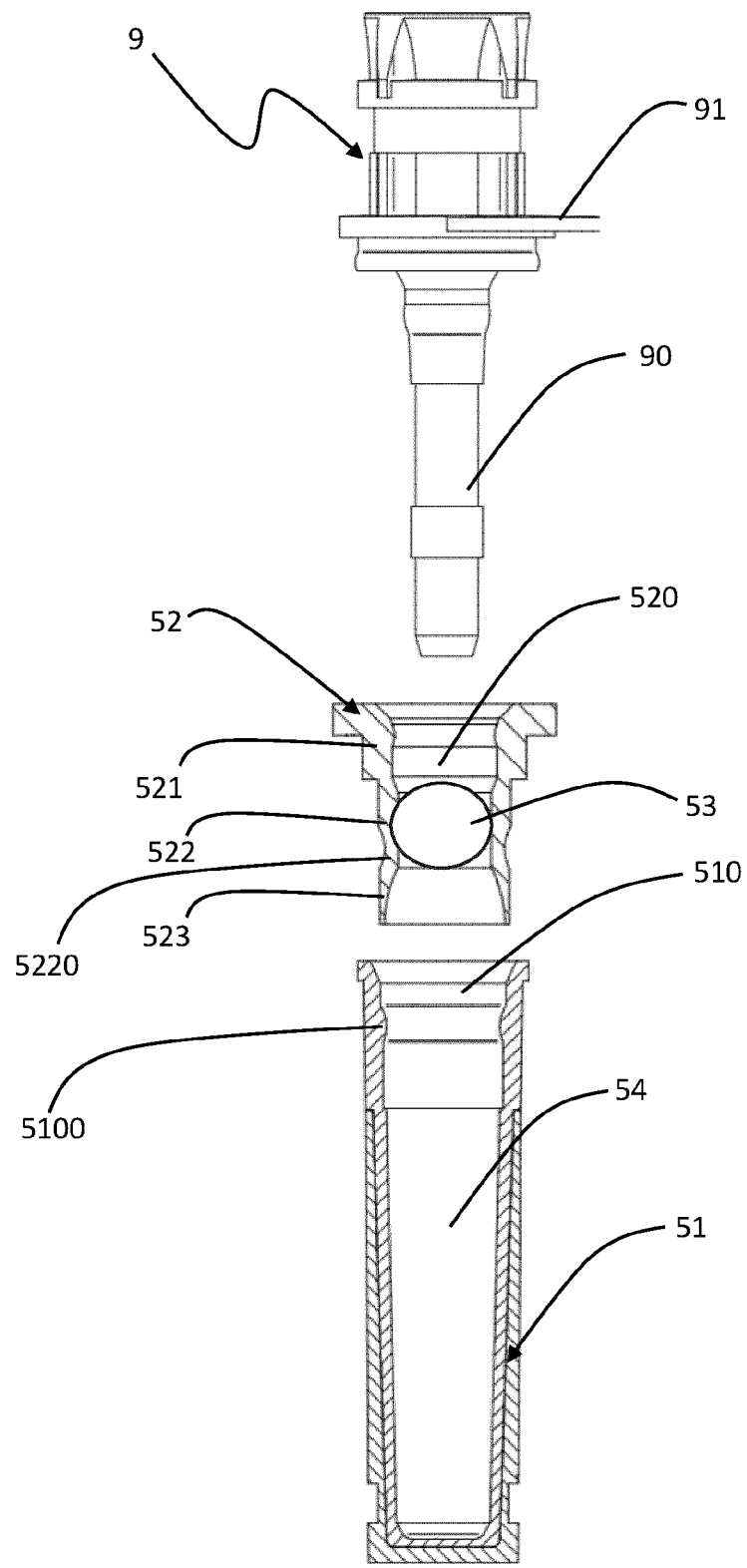
FIG. 4 illustrates an exploded cross-section view of a sampling device with a sampling member according to one embodiment of the disclosure.

Referring now to FIG. 3, we describe the first position of the closing element 53 prior to the insertion of the sampling member into the sampling device 50.

In the first position, the closing element 53 is held into the tube head 52 by force-fitting so as to plug the through-channel 520 of the tube head 52.

In this first position, the closing element 53 is held in position in the through-channel 520 of the tube head 52 and closes off its central aperture and consequently the inlet orifice of the receiving tube 51. Thus, the closing element 53 serves as a plug for the tube head 52 and the tight sealing of the receiving tube 51 is ensured.

Figure 5:
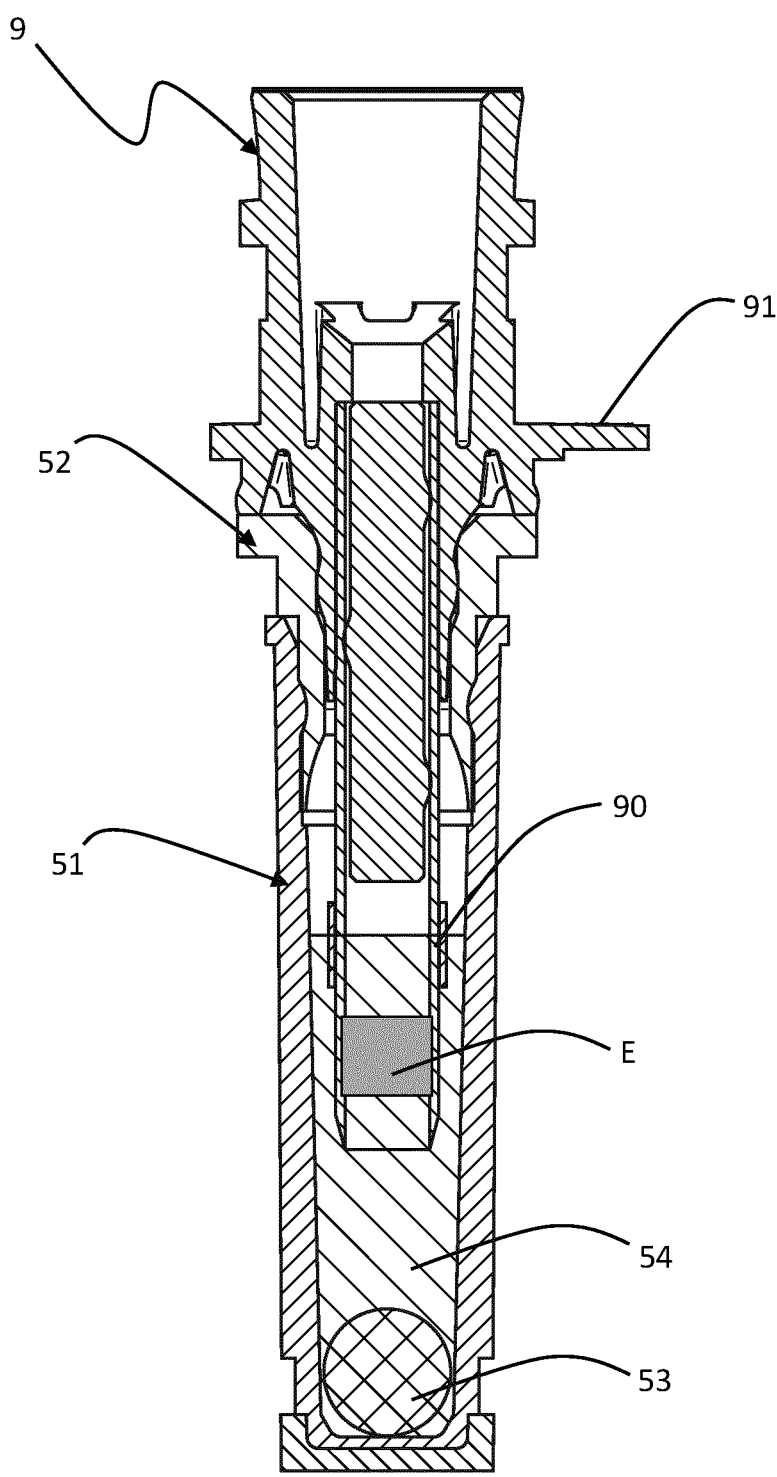
FIG. 5 illustrates a cross-section view of a sampling device with a sampling member, subsequent to the insertion of the sampling member into the sampling device, according to one embodiment of the disclosure.

Referring now to FIG. 5, we describe the second position of the closing element 53 after insertion of the sampling member into the sampling device 50.

In the second position, the closing element 53 is released into said receiving tube 51.

As illustrated in this figure, during the insertion, the sampling member 9 pushes the closing 53 into the receiving tube 51 and gets inserted at least partially into the sampling device 50. The end of the hollow needle 90 of the sampling member 9 (described in reference to FIG. 1), which has a diameter slightly smaller than that of the central aperture of the tube head 52 so as to be capable of getting inserted in the receiving tube 51, then comes into the receiving tube 51, the part including the base 91 taking a position where it abuts the rim of the tube head 52.

The closing element 53 is then released in the receiving tube 51 between the bottom of the receiving tube 51 and the sample E contained in the sampling device 9. In particular, according to at least one embodiment, the closing element 53 has a density greater than that of the agent 54, and sinks to the bottom of the receiving tube 51 when this tube is immobile. The closing element 53, in its second position, can then fulfill the function of a stirrer or mixer. Furthermore, the closing element can serve as a visual indicator to indicate that a collecting/storage has been done, especially if it has a bright color.

We now describe the structure of the tube head 52.

For example, tube head 52 may be formed of polypropylene.

As an alternative, both receiving tube 51 and tube head 52 are formed of polypropylene.

As an alternative, only the receiving tube is be formed of polypropylene.

As an alternative, receiving tube and/or tube head could be formed of polyethylene high density or polyethylene low density.

As an alternative, receiving tube and/or tube head could be formed of Acrylonitrile Butadiene Styrene.

As an alternative, receiving tube and/or tube head could be formed of Polymethyl methacrylate.

As an alternative, receiving tube and/or tube head could be formed of Polycarbonate.

As an alternative, receiving tube and/or tube head could be formed of crystal polystyrene or polystyrene or high impact polystyrene, As an alternative, receiving tube and/or tube head could be formed of Nylon, for example Nylon 6, 66, 10, or 12.

As illustrated in FIGS. 2 to 5, the tube head 52 comprises a first part 521 forming a flange capable of being supported on a rim of the receiving tube 51, and a second part 522 linked to the first part 521 and adapted to be inserted into the receiving tube 51.

The first part of the tube head 52 is thus outside the receiving tube 51 when the tube head is placed. The flange formed can be used, for example, to avoid a sinking of the tube head into the tube.

This first part can also be used to facilitate further manipulation, for example to facilitate the opening of the tube in laboratories. The upper portion of this first part is configured to be in contact with the lower part of the support 91.

The lower portion of this first part 521 can act as a guide for the positioning of the tube head into the receiving tube.

As can be seen, the second part 522 has a thickness less than a thickness of the first part 521. In this way, the force exerted on the inner surface of the receiving tube 51, near the inlet, is reduced in comparison with the force which could have been exerted if the thickness was the same, without weakening the tube head by reducing the whole thickness of this tube head.

In other terms, due to the fact that the thickness is less for this part of the tube head, the pression exerted by this part of the tube head on the inner surface of the receiving tube on each contact point is also less, in comparison with a thicker part. Indeed, the greater the thickness, the greater the pressure exerted on the wall of the receiving tube.

As illustrated, the tube head 52 also comprises a third part 523 extending from the second part 522 and forming an end of the tube head 52.

In order to limit the force exerted on said receiving tube, and similarly as for the second part 522, the third part 523 has a thickness less than the thickness of said second part 522.

Moreover, this third part includes a flared shape. In this way, second part 522 and third part 523 can be inserted by force-fitting into the receiving tube 51, and the insertion is then secured due to the fact that the insertion was made by force fitting.

To improve the placement of the tube head 52 in relation to the receiving tube 51, and in order to avoid leaks and possible contaminations, second part 522 and third part 523 have, in this embodiment, an external shape complementary to an internal shape of said receiving tube 51, for example, the internal shape shown at 5100 in the figures.

It is to be noticed also that, in this embodiment, and in the first position, the closing element 53 is maintained in the second part 522 of the tube head.

In this example, second part 522 and third part 523 have an external diameter substantially equal to 7 mm.

In alternative embodiments, second part and third part could have an external diameter greater than 7 mm, but adapted to cooperate with the receiving tube. In this way, the second part and third part of the tube head have a complementary shape as the internal shape of the part of the receiving tube cooperating with them when the tube head is in position within the receiving tube.

The second part can act for the maintaining in position of the tube head into the receiving tube and the third part for a good sealing of the tube head on the receiving tube in order to avoid possible leaks.

The inner diameter of the first part 521 can be between 5 to 5.5 mm, in order to facilitate the insertion of the needle of the sampling element in the sampling device, and also to facilitate with the sealing when the sampling element is placed and the needle inserted.

The inner diameter of the second part can be around 4.5 mm, to maintain the closing element and serving as a guide for the needle.

As illustrated, in this embodiment, the second part presents a bead 5220 adapted to be positioned on a bead 5100 of the receiving tube, said head bead 5220 of tube head and tube bead 5100 of the receiving tube presenting a complementary shape.

The inner diameter of the third part can begin around 4.5 mm and flare to around 7 mm at the end of the tube head.

According to this embodiment, the thickness of the tube head is around 2.5 mm near the inlet of the receiving tube in the second part holding the closing element in the first position, and then decreases in the third part.

In other words, the design of the tube head is such that the material is thicker at the entrance of the receiving tube (second part of the tube head, near the inlet), and decreases when going deeper in the receiving tube. This helps reducing the pressure exerted by the tube head on the wall of the receiving tube. This reduced pressure improves the durability of the tube during use (including tissue sampling, sample storage, sample processing, handling etc.), for example by preventing the wall of the receiving tube from cracking due to excess pressure. It thus also removes any leakage problems.

Alternatively, second part and third part can have an external diameter comprised between 6 mm and 8 mm.

Similarly, in this embodiment, the receiving tube 51 has an internal diameter substantially equal to 7 mm, to let the tube head 52 being placed by force-fitting.

Alternatively, the receiving tube 51 can have an internal diameter comprised between 6 mm and 8 mm.

In one embodiment, in order to improve combability with lab equipment, the receiving tube 51 has an external diameter lower than or equal to 9 mm.

In other words, in this embodiment, the design of the receiving tube is such that the receiving tube is compatible with standard racks (for example with 96 boxes) and with standard caps.

We then describe below a method for collecting a sample of animal tissue, already partly presented above, implementing a sampling device 50 according to any one of presented embodiments or alternatives. According to the disclosure, the method comprises the following steps:

applying a sampling member 9 to an animal to obtain a tissue sample of the animal;

inserting the sampling member 9 into the sampling device 50.

According to this method, and as a transition between the first position and the second position of the closing member 53, the closing member 53 is pushed into the receiving tube 51 during the step of insertion of the sampling member 9 into the sampling device 51.

According to a specific embodiment, the step of applying a sampling member 9 to an ear of an animal to obtain a tissue sample of said animal comprising the following steps:

providing a tag for identifying an animal (illustrated in FIG. 1) comprising a male part 30, including the sampling member 9 which is detachably mounted within the male part, and a female part 40;

applying both male and female part to the animal so that the sampling member 9 is able to cut out the sample of animal tissue;

detaching the sampling member from the male part.

The sampling member can thus be used as a cap for the sampling device. In this way, there is no problem of leakage when the sampling device is closed by the sampling member. The sample can stay within the needle until further analysis.

During sample analysis or processing, the sample can first be pushed out of the needle, inside the receiving tube, and then the sampling device can easily be opened by removing the tube head.

In particular, the use of a tube head on the receiving tube enables an automation of the opening of the tubes in a laboratory through the "uncapping" of the tube head in such a way that the sample and the closing element remain within the tube which does not disrupt further processing or analysis.

Moreover, due to the fact that no element is sealed on the rim of the receiving tube, the rim of the receiving tube is not distorted or otherwise negatively impacted by the sealing process, and so when opening/uncapping a group of receiving tubes, for example tubes placed in a rack, such receiving tube can more efficiently cooperate with classic caps or plates of caps. In other words, the surface at the entrance of the sampling tube does not have irregular shapes or otherwise uneven surface features that would disrupt efficient processing and analysis, at least in part because no glue or heat sealing has been used to close the sampling device.

In addition, as already mentioned, as the rim of the receiving tube is not distorted or negatively impacted by the sealing process, sealing troubles such as leaks are reduced or eliminated. Further, the tube heads of the disclosed devices can be placed in an abutted manner relative to the receiving tube.

Figure 6:
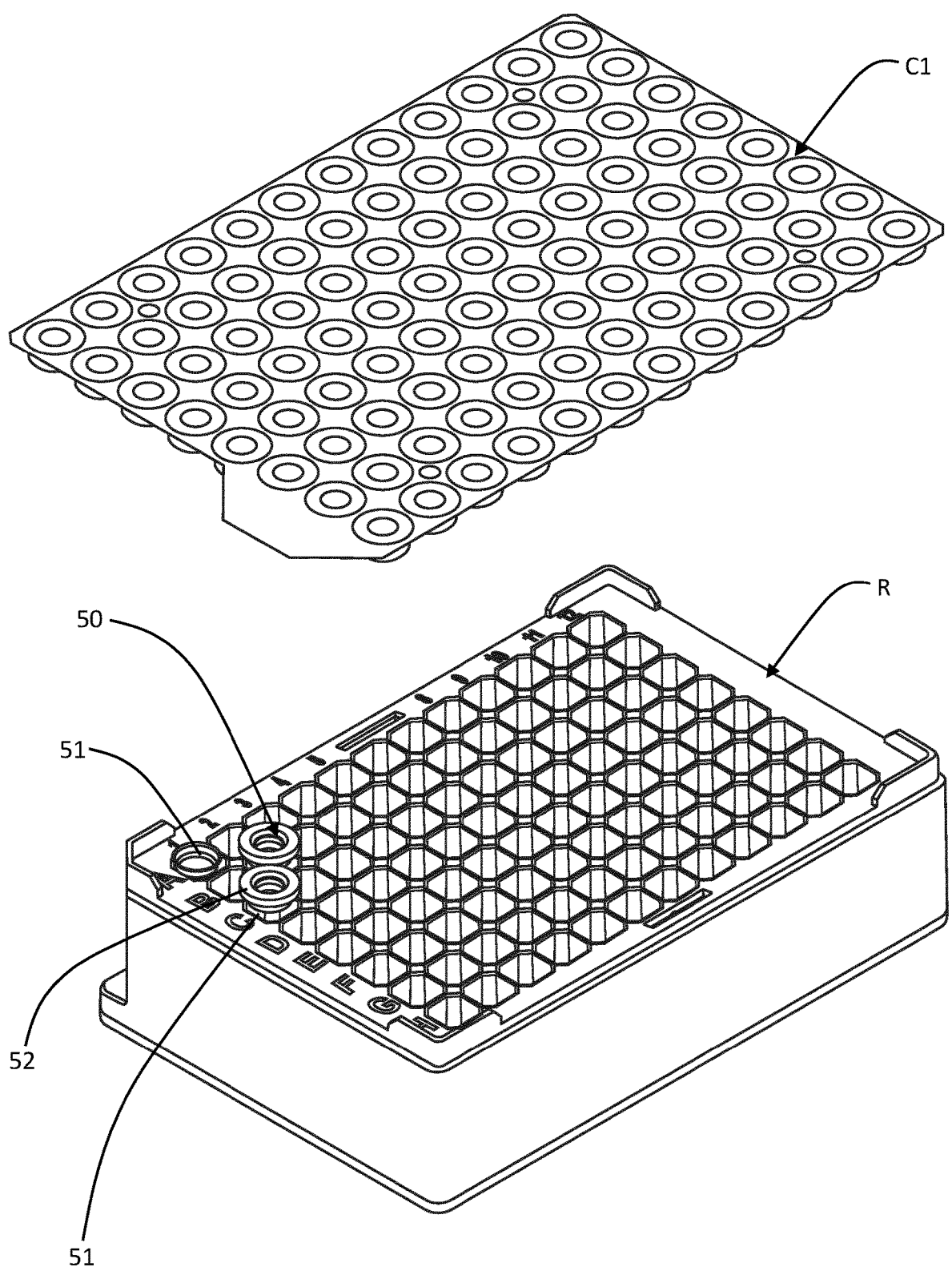
FIG. 6 illustrates a perspective view of some sampling devices according to one embodiment of the disclosure, used with material lab according to one embodiment.
Figure 7:
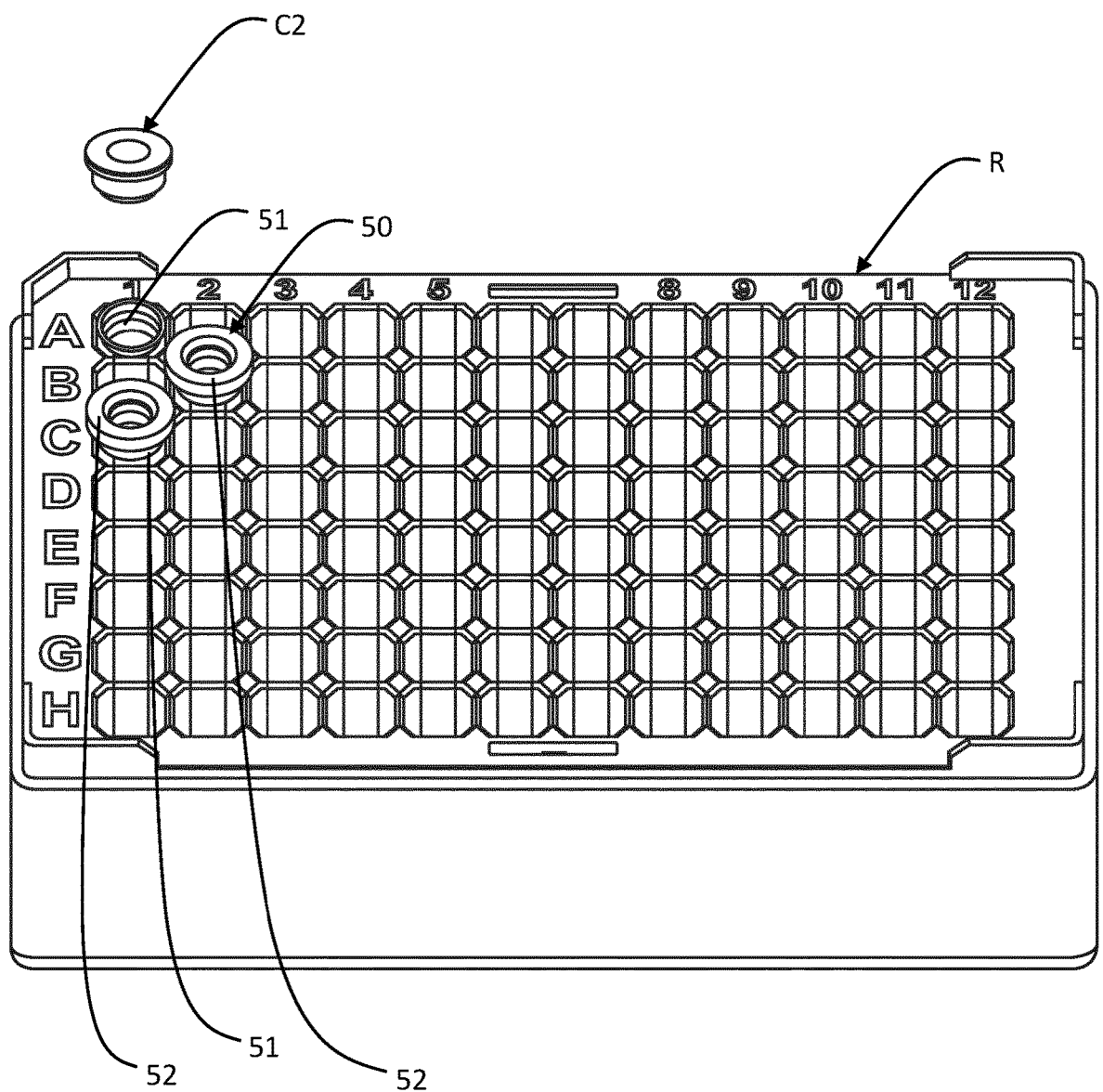
FIG. 7 illustrates a perspective view of some sampling devices according to one embodiment of the disclosure, used with material lab according to another embodiment.

Some examples of sampling devices 50 according to one embodiment of the invention, placed in a rack R, and cooperating with a cap C2 or a plate of caps C1 are illustrated in FIGS. 6 and 7.

As illustrated in FIG. 6, two receiving tubes 51 provided with tube heads 52 and another receiving tube which has no more tube head are placed in a rack R able to receive 96 tubes. Those tubes are able to cooperate with a plate C1 of caps comprising 96 caps.

Similarly, in FIG. 7, two receiving tubes 51 provided with tube heads 52 and another receiving tube which has no more tube head are placed in a rack R able to receive 96 tubes. Those tubes are able to cooperate with an individual cap C2.

Such rack R, plate C1 of caps, and individual cap C2 can be, preferentially, classic material used in labs in order to implement a solution which does not represent an important cost to be used for analysis.

The invention claimed is:

1. A sampling device adapted to cooperate with a sampling member subsequent to collection of a sample of animal tissue, said sampling device comprising:

a receiving tube designed for receiving said sample of animal tissue, containing at least one specific agent and comprising an inlet;

a tube head removably attached to said inlet of said receiving tube and provided with a through channel ending in the receiving tube; and a closing element configured to take at least two positions:

a first position, in which said closing element is held into said tube head so as to plug said through channel of said tube head, and a second position, in which said closing element is released into said receiving tube;

wherein said tube head comprises a first part forming a flange capable of being supported on a rim of the receiving tube;

a second part linked to said first part and adapted to be inserted into said receiving tube, said second part having a thickness less than a thickness of said first part;

and a third part extending from said second part and forming an end of said tube head, said third part having a flared shape presenting a thickness less than said thickness of said second part.

2. The sampling device according to claim 1, wherein said second part and third part are inserted by force-fitting into said receiving tube, said second part and third part having an external shape complementary to an internal shape of said receiving tube.

3. The sampling device according to claim 1, wherein said second part and third part have an external diameter comprised between 6 mm and 8 mm, preferentially substantially equal to 7 mm.

4. The sampling device according to claim 1, wherein said receiving tube has an external diameter lower than or equal to 9 mm.

5. The sampling device according to claim 1, wherein said receiving tube has an internal diameter comprised between 6 mm and 8 mm, preferentially substantially equal to 7 mm.

6. The sampling device according to claim 1, wherein said through-channel is almost cylindrical in the portion holding the closing element in the first position, and has a diameter comprised between 4 mm and 5 mm, preferentially substantially equal to 4.5 mm.

7. The sampling device according to claim 1, wherein at least one of said receiving tube or said tube head is formed in thermoplastic polymer.

8. The sampling device according to claim 1, wherein said closing element is a sphere or a cylinder.

9. The sampling device according to claim 1, wherein said closing element has a density greater than or equal to that of said at least one specific agent contained in said receiving tube.

10. A method for comprising:

collecting a sample of animal tissue, with a sampling device adapted to cooperate with a sampling member subsequent to collection of the sample of animal tissue, said sampling device comprising:

a receiving tube designed for receiving said sample of animal tissue, containing at least one specific agent and comprising an inlet;

a tube head removably attached to said inlet of said receiving tube and provided with a through channel ending in the receiving tube; and a closing element configured to take at least two positions:

a first position, in which said closing element is held into said tube head so as to plug said through channel of said tube head, and a second position, in which said closing element is released into said receiving tube, wherein said tube head comprises a first part forming a flange capable of being supported on a rim of the receiving tube;

a second part linked to said first part and adapted to be inserted into said receiving tube, said second part having a thickness less than a thickness of said first part; and a third part extending from said second part and forming an end of said tube head, said third part having a flared shape presenting a thickness less than said thickness of said second part, wherein the collecting comprises:

applying the sampling member to an animal to obtain the sample of animal tissue of said animal; and inserting said sampling member into said sampling device.

11. The method according to claim 10, said closing element being pushed into said receiving tube during said step for inserting said sampling member into said receiving tube.

12. The method according to claim 10, wherein applying the sampling member to the animal to obtain the sample of animal tissue of said animal comprises:

providing a tag for identifying the animal, the tag comprising a male part, including said sampling member detachably mounted within said male part, and a female part;

applying said male and female part to said animal so that said sampling member is able to cut out the sample of animal tissue; and detaching said sampling member from said male part.

13. A system for identifying an animal comprising:

a tag for identifying an animal comprising:

a male part comprising at least one sampling member to cut out a sample of animal tissue, said sampling member being detachably mounted within said male part; and a female part (40), and a sampling device for collecting the sample of animal tissue, said sampling device comprising:

a receiving tube designed for receiving said sample of animal tissue, containing at least one specific agent and comprising an inlet;

a tube head removably attached to said inlet of said receiving tube and provided with a through channel ending in the receiving tube; and a closing element configured to take at least two positions:

a first position, in which said closing element is held into said tube head so as to plug said through channel of said tube head, and a second position, in which said closing element is released into said receiving tube;

wherein said tube head comprises a first part forming a flange capable of being supported on a rim of the receiving tube;

a second part linked to said first part and adapted to be inserted into said receiving tube, said second part having a thickness less than a thickness of said first part; and a third part extending from said second part and forming an end of said tube head, said third part having a flared shape presenting a thickness less than said thickness of said second part.

\* \* \* \* \*